J. H. CLEMMER.
ELECTRICALLY OPERATED VALVE.
APPLICATION FILED NOV. 18, 1914.
1,177,761. Patented Apr. 4, 1916.
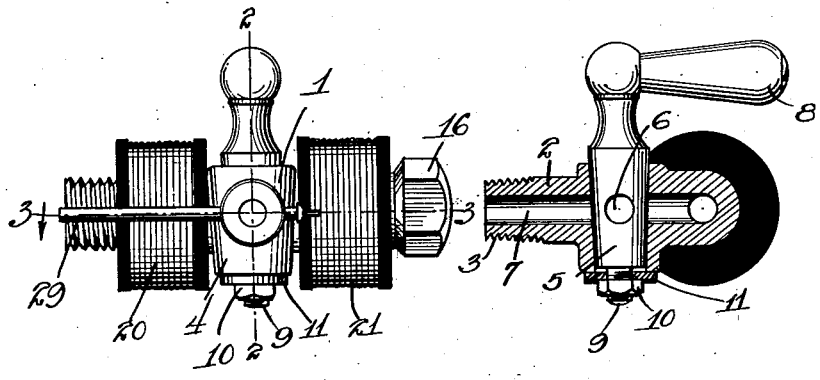
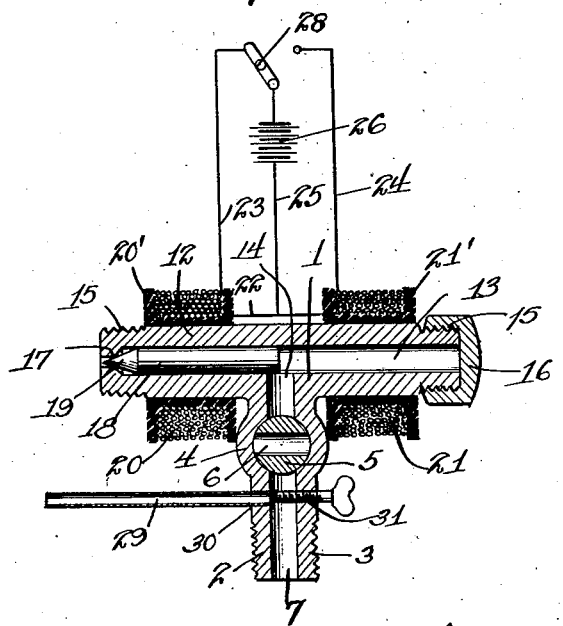
Inventor
James H. Clemmer
Witnesses
By Richard B. Owen,
Attorney

UNITED STATES PATENT OFFICE.

JAMES H. CLEMMER, OF BLUE CREEK, WEST VIRGINIA.

ELECTRICALLY-OPERATED VALVE.

1,177,761.  Specification of Letters Patent.  Patented Apr. 4, 1916.

Application filed November 18, 1914. Serial No. 872,812.

*To all whom it may concern:*

Be it known that I, JAMES H. CLEMMER, a citizen of the United States, residing at Blue Creek, in the county of Kanawha and State of West Virginia, have invented certain new and useful Improvements in Electrically-Operated Valves, of which the following is a specification.

This invention relates to valves and has particular reference to devices for actuating the valve to control a fluid passing therethrough.

My invention is particularly adapted for use in connection with gas valves and the like, but it will be readily appreciated by those skilled in the art that my invention may be applied to divers uses.

My invention is particularly valuable to gas burners for illuminating or heating purposes in which a pilot is left lighted at all times so as to ignite the main burner when the gas or the like is turned on.

With the above and other objects in view my invention resides preferably in the construction, combination and arrangement of parts as hereinafter set forth in the specification and illustrated in the accompanying drawings, in which:—

Figure 1 is a side elevation of a valve showing my improvement applied thereto; Fig. 2 is a transverse sectional view on the line 2—2 of Fig. 1; and Fig. 3 is a longitudinal sectional view of my improved device taken on the line 3—3 of Fig. 1 looking in the direction of the arrows.

Similar reference characters indicate similar parts throughout the various views of the drawings.

Referring more particularly to the drawings in which the preferred embodiment of my invention is illustrated, the numeral 1 indicates generally the body of the valve, having a tubular portion comprising a conduit 2, said conduit 2 being threaded at 3 for connection to a source of supply of gas or the like. The said tubular portion 2 is provided with an enlarged portion 4, as indicated to advantage in Fig. 3, in which is mounted a rotary valve plug 5 having a transverse opening 6 therein, said valve plug 5 serving to control the flow of fluid or the like through the bore 7 of the tubular portion 2. A handle 8 is carried by the upper end of the valve plug 5 to facilitate movement of the said valve plug. The lower end of the valve plug 5 is reduced as shown at 9 and threaded to receive a nut 10, the said nut 10 bearing upon a washer 11 to secure the valve plug 5 in position within the enlarged portion 4 of the tubular member 2. This is the usual construction of a valve and need not be further dwelt upon.

The tubular member 2 is provided at one of its ends with a transverse conduit 12 having a central duct 13 therein, communicating with the central duct 7 in the tubular member 2, as shown at 14. Both ends of the transverse conduit 12 are provided with external screw threads 15, one set of said threads being adapted to receive a cap 16, to close one end of the central duct 13, and the opposite end being adapted for connection to a gas burner for heating or illuminating, or the like. The central duct 13 is reduced as shown at 17 at one of its ends to provide a valve seat for a purpose which will be hereinafter apparent. Mounted for slidable movement in the central duct 13 I provide a valve which in the present instance comprises a cylindrical rod 18 having one end thereof ground to a point 19 for insertion and seating in the reduced portion 17 of the duct 13. The said valve 18 must of necessity be formed of some magnetic metal such as iron or steel. Soft iron is preferable as this does not permanently magnetize which would possibly interfere with the smooth operation of my invention.

In order to reciprocate the valve 18 and thereby open and close the conduit I provide a pair of electro-magnets 20 and 21, said electro-magnets being mounted upon and securely attached to the transverse tubular member 12. The windings of the electro-magnets 20 and 21 are wound upon spools 20' and 21' so as to thoroughly insulate the windings from the tubular member 12. Said electro-magnets 20 and 21 have one of each of their terminals connected by means of a lead 22 as shown in Fig. 3 and the other terminals of the said electro-magnets 20 and 21 are connected to leads 23 and 24. The lead 22 is connected to a source of E. M. F. by means of a wire 25, a battery or other source of current being indicated at 26, the opposite terminal of the battery being connected by means of a switch arm 28 to either of the leads 23 or 24 as so desired. The electro-magnets may be of any approved construction and are adapted to alternately attract the valve 18 causing the same to reciprocate within the central duct 13, whereby to open and close the passage way.

I provide a pilot or tube 29 connected at 30 to the member 2 and communicating with the central duct 7, the said supply of fluid or the like and the pilot tube 29 being controlled by means of a screw 31 which is adapted to be engaged upon the open end of the tube 29 at the option of the user.

From the above description taken in connection with the accompanying drawings it is thought that a clear and comprehensive understanding of the construction, operation and advantages of my invention may be readily had. When it is desired to control the flow of fluid through the valve, the valve member 18 may be actuated by means of the electro-magnets 20 and 21, the valve being shown in closed position in Fig. 3. If it is desired to open the valve the electromagnets 21 will be energized by means of moving the switch arm 28 into contact with the free end of the lead 24. This will cause the current to flow to the said electromagnet 21, energizing the same and attracting the valve 18 which acts in the manner of an armature. It will be readily noted that the cap 16 will limit the movement of the valve member 18 in that direction and that the reduced portion 17 limits the movement of the valve member 18 in the other direction. When it is desired to close the burner, the arm is drawn to the position shown in Fig. 3, thereby energizing the electro-magnet 20 and attracting the valve member 18 into the position shown in Fig. 3, whereby to close the opening and preventing the flow of the fluid through the tubular members 2 and 12. If it is desired the amount of fluid which is being supplied to the burner or the like may be additionally controlled by the valve 5. It being understood that the pilot burner remains lighted at all times, so that when the valve 18 is moved in such a manner as to open the conduit 13 the lamp or stove or the like will immediately become lighted.

From the above description taken in connection with the accompanying drawings it is thought that it will be seen that I have provided a control for gas burners or the like which is simple in construction, cheap to manufacture, positive in operation, and one which is durable and capable of long life.

I desire to lay stress upon the simplicity of construction of my invention, and it will be readily seen that the construction illustrated is applicable to almost any type of valves and use. It has been found it is not necessary for the electrical current to be left on either during the time that the valve is closed or open, as the electro-magnet 20 moves the valve 18 at a speed which is sufficient to engage the same with the seat 17 to prevent leakage of the gas, it being also noted that the gas forcing against the rear end of the valve 18 will have a tendency to prevent accidental movement of the same, it being of course understood that the electro-magnet is of sufficient strength to actuate the valve 18.

While I have shown and described my invention as possessing a peculiar form and construction, it is desired that it be understood that I may make such changes in the detail structure thereof as do not depart from the spirit and scope of the invention as claimed.

Having thus described my invention, what I claim and desire to secure by Letters Patent, is:—

1. A device as specified, including a body having a conduit, said body provided with laterally extending arms on one end thereof, said arms having a central bore open at one end and communicating intermediate its ends with said conduit, a valve member slidable in said bore to close the open end, and a pair of solenoids on said arms to actuate said valve member.

2. A device as specified, including a T-shaped body having a bore in the horizontal portion thereof open at one end and provided with a valve seat, the stem of said body having a passage communicating with said bore, a valve member movable in said bore to engage said valve seat, and electro-magnets on the respective ends of said horizontal portion for operating said valve member to open and close said bore.

In testimony whereof I affix my signature in presence of two witnesses.

JAMES H. CLEMMER.

Witnesses:
R. R. FISHER,
F. H. CARPENTER.